(12) United States Patent
Shyu et al.

(10) Patent No.: US 7,643,749 B2
(45) Date of Patent: Jan. 5, 2010

(54) CAMERA MODULE

(75) Inventors: Jyh-Horng Shyu, Hsinchu (TW);
Sheng-Chieh Yang, Hsinchu (TW);
Chu-Ming Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 251 days.

(21) Appl. No.: 11/752,937

(22) Filed: May 24, 2007

(65) Prior Publication Data

US 2008/0019684 A1    Jan. 24, 2008

(30) Foreign Application Priority Data

Jul. 24, 2006    (TW) .............................. 951296906 A

(51) Int. Cl.
*G03B 41/00* (2006.01)
(52) U.S. Cl. ...................................... 396/332
(58) Field of Classification Search ................. 396/322, 396/323, 331, 332, 9, 326; 348/39, 59, 343, 348/344, 14.02; 352/47, 70; 359/222
See application file for complete search history.

(56) References Cited

U.S. PATENT DOCUMENTS 2,106,752 A * 2/1938 Land ........................... 396/331
2,961,920 A * 11/1960 Sachtleben .................... 355/20
3,251,933 A * 5/1966 Beste ............................. 348/49
4,687,310 A * 8/1987 Cuvillier ...................... 396/327
5,111,223 A * 5/1992 Omura ......................... 396/333
5,349,403 A * 9/1994 Lo .............................. 396/324
6,414,791 B1 * 7/2002 Sugawara .................... 359/497
7,162,153 B2 * 1/2007 Harter et al. ................. 396/331

FOREIGN PATENT DOCUMENTS

TW            377069      12/1999

* cited by examiner

*Primary Examiner*—W. B. Perkey
*Assistant Examiner*—Noam Reisner
(74) *Attorney, Agent, or Firm*—Jianq Chyun IP Office

(57) ABSTRACT

A camera module includes an image sensor, a first lens, a second lens and a beam splitting and combining component. The beam splitting and combining component is disposed between the first lens, the second lens and the image sensor. The first lens is suitable for imaging a first light beam of a first object onto the image sensor, while the second lens is suitable for imaging a second light beam of a second object onto the image sensor. In addition, both the first light beam and the second light beam are imaging onto the image sensor through the beam splitting and combining component. Therefore, the camera module is able to provide a two-way image-capturing function.

10 Claims, 12 Drawing Sheets

CAMERA MODULE

CROSS-REFERENCE TO RELATED APPLICATION

This application claims the priority benefit of Taiwan application serial no. 95126906, filed Jul. 24, 2006. All disclosure of the Taiwan application is incorporated herein by reference.

BACKGROUND OF THE INVENTION

1. Field of the Invention

The present invention relates to an image-capturing module, and more particularly, to a camera module.

2. Description of the Related Art

Referring to FIG. 1A, a conventional notebook computer 100 has a base 110 and a hinge cover 120, wherein a screen 122 and a camera module 124 are disposed on the hinge cover 120. Due to the limitation of the horizontal and vertical field angles, only the object the front surface 120a of the hinge cover 120 faces can be captured. To capture the object the back surface 120b of the hinge cover 120 faces, the notebook computer 100 needs to be moved to let the lens of the camera module 124 face to the object, which causes inconvenience.

Referring to FIG. 1B, a conventional notebook computer 100a has a swiveling device 126 disposed on a hinge cover 120' and a camera module 124a is disposed on the swiveling device 126. Thus, by manipulating the swiveling device 126, the user can conveniently change the focus of the lens of the camera module 124a. For example, the user only needs to turn the camera module 124a through the swiveling device 126 to change the focus the lens towards the object located behind the hinge cover 120' in order to capture the image of the object located behind the hinge cover 120'.

Referring to FIG. 2, a screen 210 and a first camera module 220 are disposed on the front surface 202 of a conventional mobile phone 200, while a second camera module 230 is disposed on the back surface 204 thereof. Wherein, two camera modules are used with the mobile phone 200 to achieve the expected two-way image-capturing function. It is clear such a design employing two camera modules (i.e. two lenses and two image sensor are required) results in a higher production cost accompanied with a bulky shape. Besides, to reduce the cost of the mobile phone with dual cameras, some manufacturers propose using an image sensor with a lower number of effective pixels for the infrequently-used first camera module 220, which makes the image quality captured by the first camera module 220 inferior compared to that captured by the second camera module 230.

SUMMARY OF THE INVENTION

The objective of the present invention is to provide a camera module with the two-way image-capturing function and thereby reduce the production cost.

To achieve the above-described or other objective, the present invention provides a camera module, which includes an image sensor, a first lens, a second lens and a beam splitting and combining component. The beam splitting and combining component is disposed between the first lens, the second lens and the image sensor. The first lens is suitable for imaging a first light beam of a first object onto the image sensor, while the second lens is suitable for imaging a second light beam of a second object onto the image sensor. In addition, both of the first light beam and the second light beam are imaging onto the image sensor through the beam splitting and combining component.

The beam splitting and combining component can be a total internal reflection prism (TIR prism) with a total reflection surface, and the first lens and the second lens are respectively located at two adjacent side surfaces of the beam splitting and combining component, wherein the first light beam is suitable for imaging onto the image sensor by taking an optical path passing through the total reflection surface, while the second light beam is suitable for imaging onto the image sensor by taking another optical path reflected by the total reflection surface. The beam splitting and combining component can also be an X-prism. The X-prism has a first reflection surface and a second reflection surface intersecting each other at the middle thereof, while the first lens and the second lens are respectively located at two side surfaces opposite to each other of the X-prism, wherein the first light beam is suitable for imaging onto the image sensor by taking an optical path reflected by the first reflection surface, while the second light beam is suitable for imaging onto the image sensor by taking another optical path reflected by the second reflection surface. Further, the beam splitting and combining component can be a reflection mirror capable of swinging between a first position and a second position. At the first position, the reflection mirror reflects the first light beam onto the image sensor, while at the second position, the reflection mirror reflects the second light beam onto the image sensor.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The First Embodiment

Figure 1A:
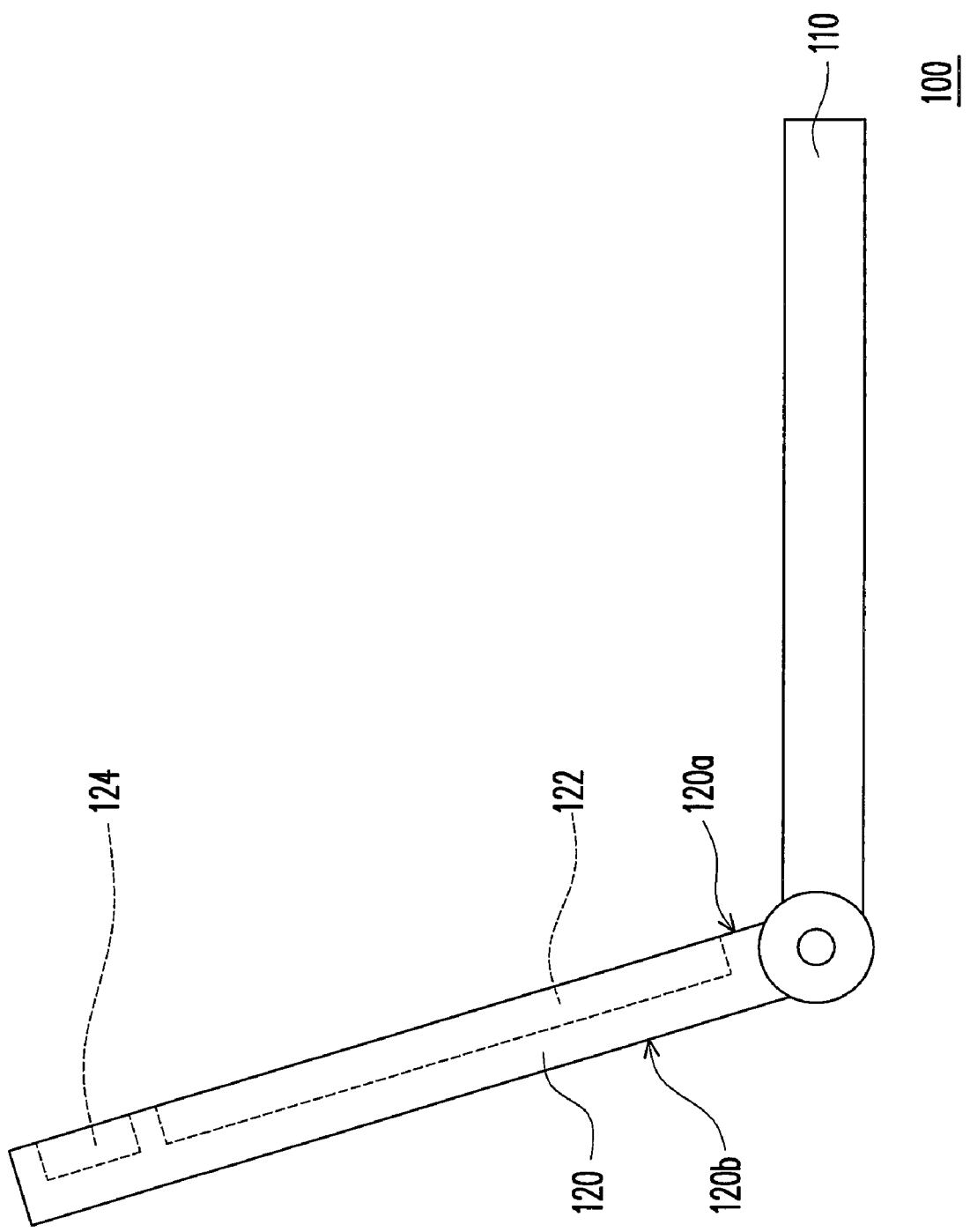
FIG. 1A is a diagram of a conventional notebook computer equipped with a fixed camera module.
Figure 1B:
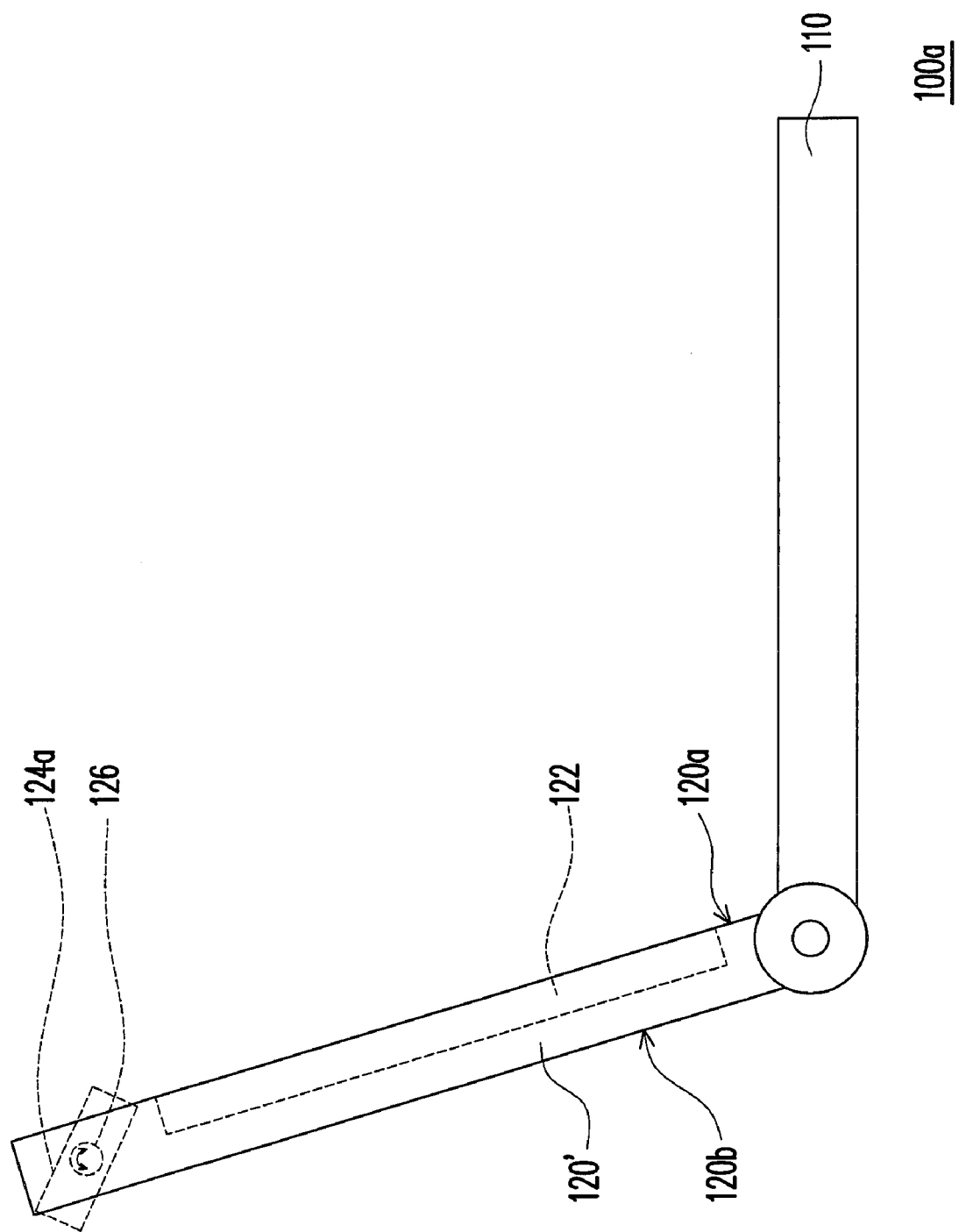
FIG. 1B is a diagram of a conventional notebook computer equipped with a swiveling camera module.
Figure 2:
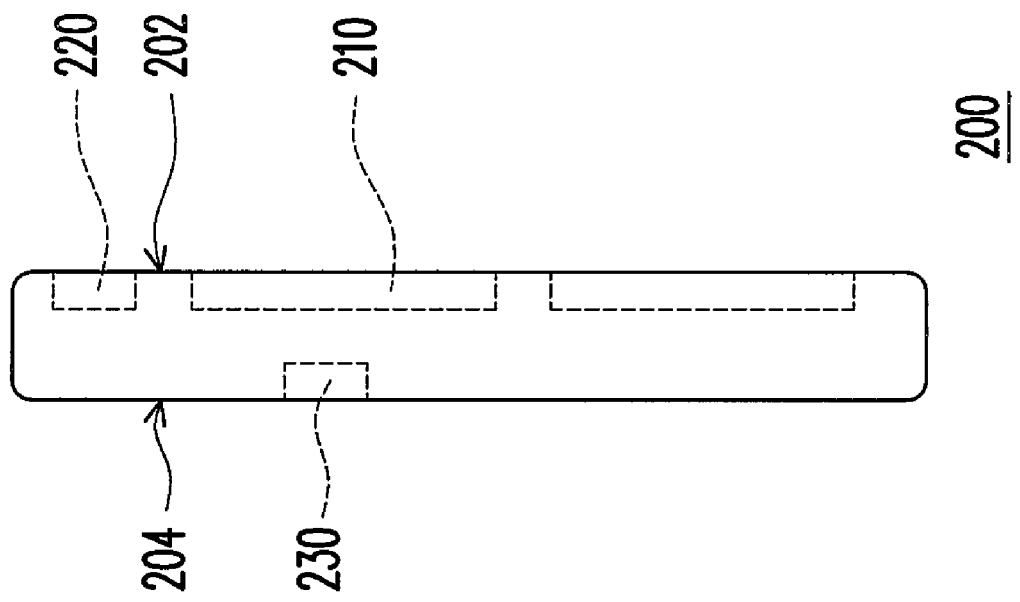
FIG. 2 is a diagram of a conventional mobile phone equipped with two camera modules.
Figure 3A:
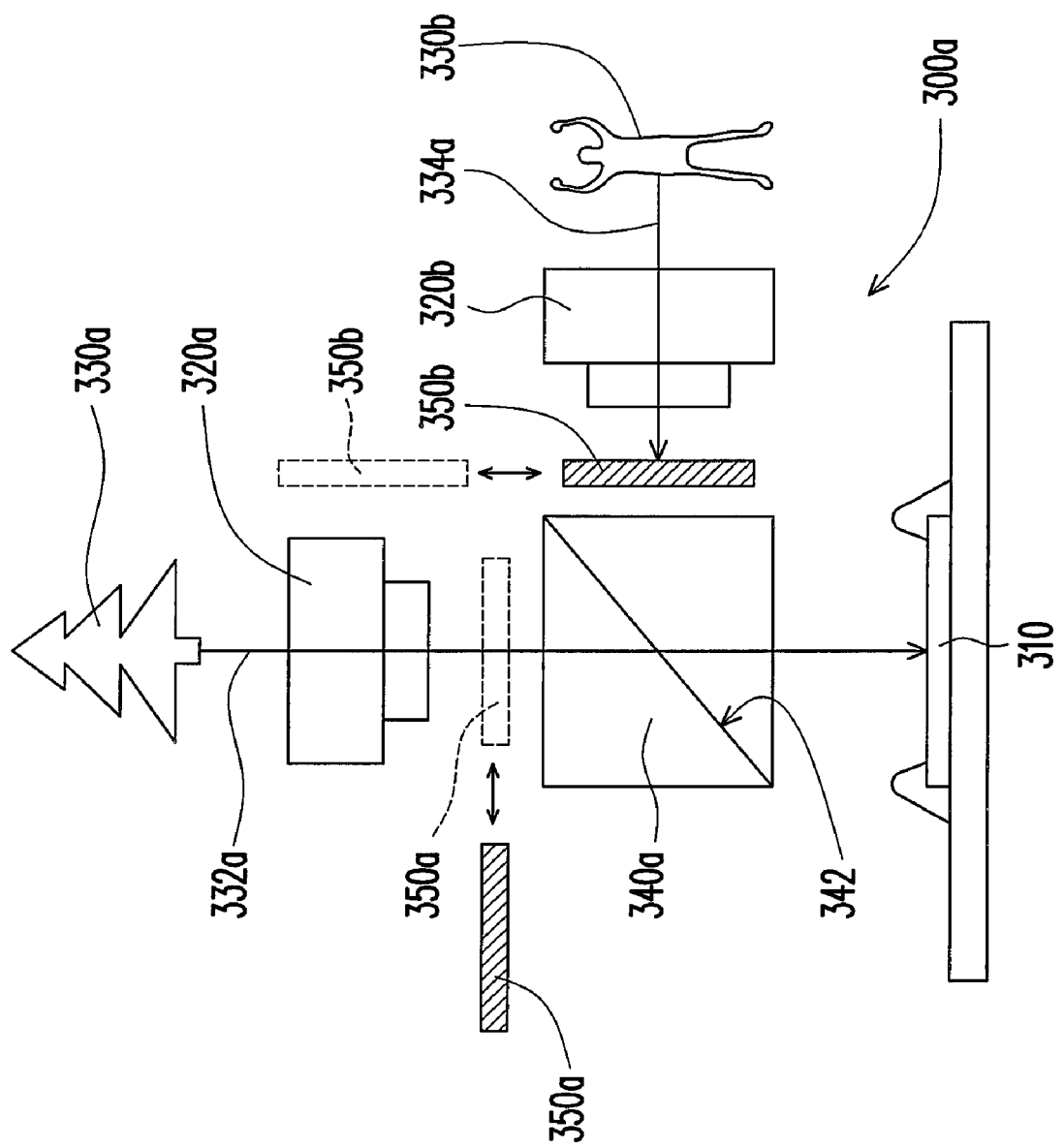
FIG. 3A and FIG. 3B are diagrams respectively illustrating a camera module and the imaging light path thereof according to a first embodiment of the present invention.
Figure 3B:
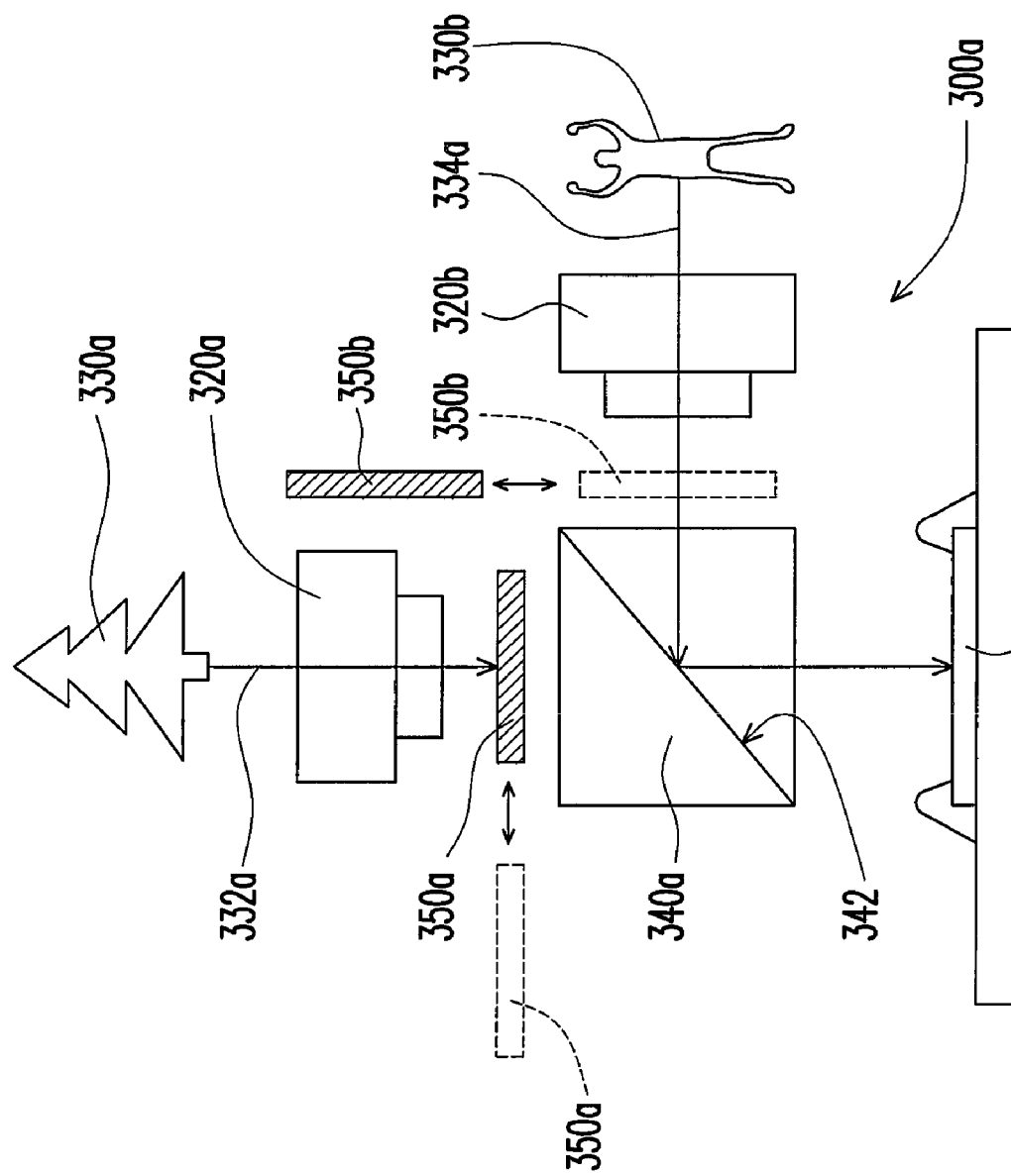

FIG. 3A and FIG. 3B are diagrams respectively illustrating a camera module and the imaging light path thereof according to the first embodiment of the present invention. Referring to FIG. 3A, a camera module 300a includes an image sensor 310, a first lens 320a, a second lens 320b and a beam splitting and combining component 340a, wherein the beam splitting and combining component 340a is disposed between the first lens 320a, the second lens 320b and the image sensor 310. The first lens 320a is suitable for imaging the first light beam 332a of a first object 330a opposite to the first lens 320a onto the image sensor 310 (as shown in FIG. 3A), while the second lens 320b is suitable for imaging the second light beam 334a of a second object 330b opposite to the second lens 320b onto the image sensor 310 (as shown in FIG. 3B).

The beam splitting and combining component 340a is used to make two incident light beams enter from different directions, the first light beam 332a and the second light beam 334a are imaging onto the image sensor 310. In the embodiment, the beam splitting and combining component 340a is, for example, a TIR prism, which has a total reflection surface 342, while the first lens 320a and the second lens 320b are respectively located at two adjacent side surfaces of the beam splitting and combining component 340a and at two sides of the total reflection surface 342. In addition, the first light beam 332a is suitable for imaging onto the image sensor 310 along an optical path passing through the total reflection surface 342, while the second light beam 334a is suitable for imaging onto the image sensor 310 along another optical path reflected by the total reflection surface 342. The image sensor 310 is, for example, a charge coupled device (CCD) or a complementary metal oxide semiconductor image sensor (CMOS image sensor), which are suitable for sensing the first light beam 332a or the second light beam 334a projected thereon for capturing the image of the first object 330a or the second object 330b.

The camera module 300a of the present embodiment may further include a first light shield 350a and a second light shield 350b. The first light shield 350a can be shifted into or shifted off between the beam splitting and combining component 340a and the first object 330a, while the second light shield 350b can be shifted into or shifted off between the beam splitting and combining component 340a and the second object 330b. In the present embodiment, the first light shield 350a is suitable to be shifted into or shifted off between the beam splitting and combining component 340a and the first lens 320a, while the second light shield 350b is suitable to be shifted into or shifted off between the beam splitting and combining component 340a and the second lens 320b.

As shown by FIG. 3A, in order to capture the image of the first object 330a, the first light shield 350a is shifted off between the beam splitting and combining component 340a and the first lens 320a to allow the first lens 320a for imaging the first light beam 332a onto the image sensor 310, meanwhile the second light shield 350b is shifted into between the beam splitting and combining component 340a and the second lens 320b for blocking the second light beam 334a. On the other hand, as shown by FIG. 3B, in order to capture the image of the second object 330b, the first light shield 350a is shifted into between the beam splitting and combining component 340a and the first lens 320a for blocking the first light beam 332a, meanwhile the second light shield 350b is shifted off between the beam splitting and combining component 340a and the second lens 320b to allow the second lens 320b for imaging the second light beam 334a onto the image sensor 310.

The above-mentioned operation of capturing an image can be a still photographing or a movie photographing. For movie photographing mode, the first light shield 350a and the second light shield 350b are repeatedly and alternately shifted into or off, wherein, as the first light shield 350a is shifted into, the second light shield 350b is coordinately shifted off. The shift frequency of the first light shield 350a and the second light shield 350b is, for example, 60 Hz or higher, so as to reach the goal of photographing the first object 330a and the second object 330b simultaneously.

The camera module 300a of the embodiment has the first lens 320a and the second lens 320b aimed at different directions for providing a two-way image-capturing function; therefore, compared to the conventional scheme where two camera modules are required, the camera module 300a of the embodiment can save one image sensor, which results in a less size and a lower cost. Besides, the first light beam 332a and the second light beam 334a are imaging onto the same image sensor 310, which assures the same image quality for both the first object 330a and the second object 330b.

The Second Embodiment

Figure 4:
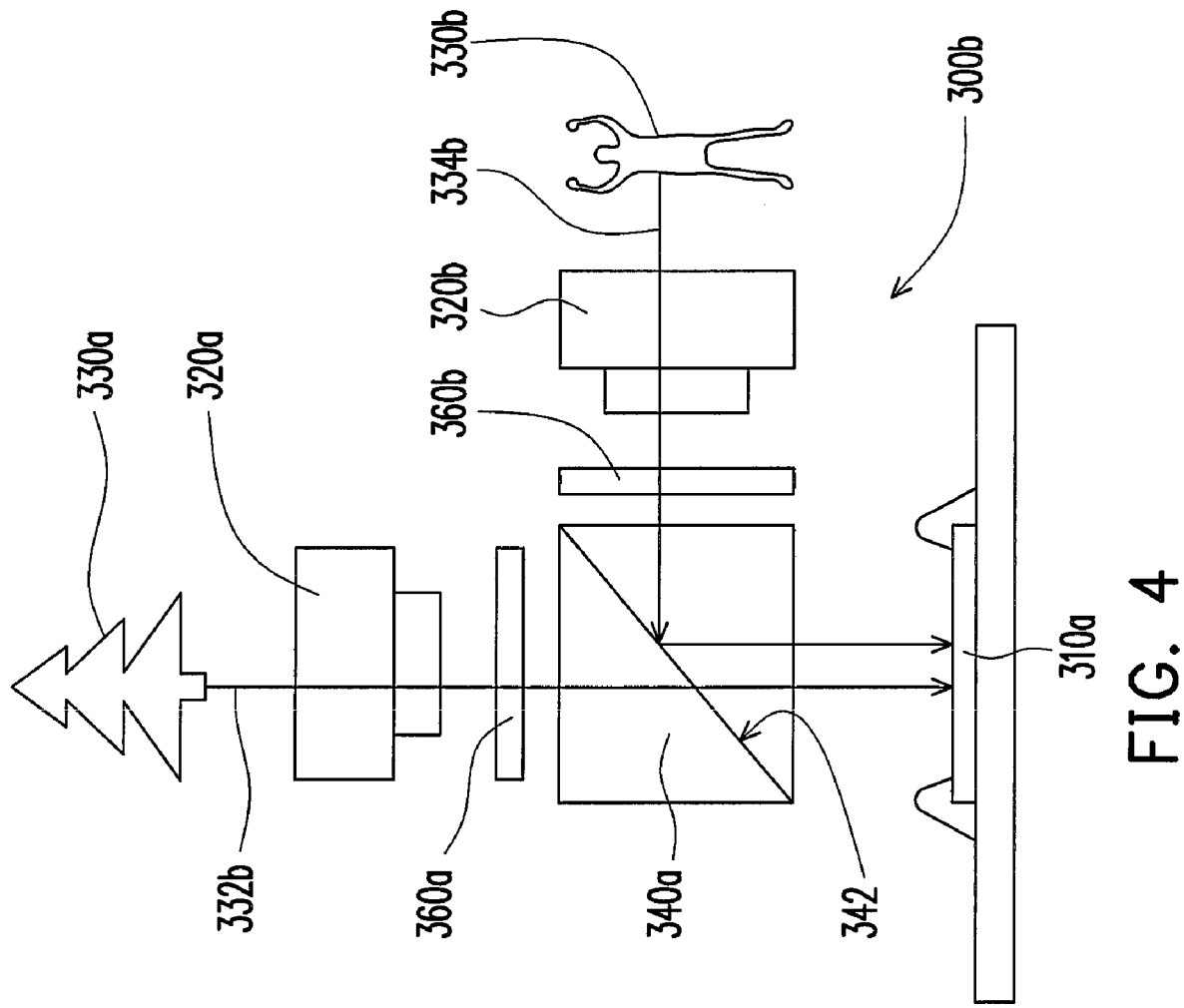
FIG. 4 is a diagram illustrating a camera module and the imaging light path thereof according to a second embodiment of the present invention.

FIG. 4 is a diagram illustrating a camera module and the imaging light path thereof according to the second embodiment of the present invention. Referring to FIG. 4, the structure of the camera module 300b is roughly same as the structure of the camera module 300a in the first embodiment except for the camera module 300b including a first polarizing plate 360a disposed between the first object 330a and the beam splitting and combining component 340a and a second polarizing plate 360b disposed between the second object 330b and the beam splitting and combining component 340a in addition to no requirement to use the first light shield 350a and the second light shield 350b therein. In this embodiment, the first polarizing plate 360a is disposed between the first lens 320a and the beam splitting and combining component 340a and the second polarizing plate 360b is disposed between the second lens 320b and the beam splitting and combining component 340a. The image sensor 310a of the camera module 300b is able to simultaneously sense two polarized light beams in different phase angles.

In more detail, the first polarizing plate 360a is suitable to change the phase angle of the first light beam 332b to θ1, while the second polarizing plate 360b is suitable to change the phase angle of the second light beam 334b to θ2, wherein θ1 is, for example, 0 degree, and θ2 is, for example, 90 degree. In addition, the image sensor 310a is, for example, a complementary metal oxide semiconductor image sensor (CMOS image sensor), which is able to simultaneously sense the first light beam 332b with θ1 phase angle and the second light beam 334b with θ2 phase angle.

Compared to the camera module 300a, the camera module 300b of the present embodiment has no moveable part (i.e. the first light shield 350a and the second light shield 350b are not required), which makes the structure simple and further reduce the production cost.

The Third Employment

Figure 5A:
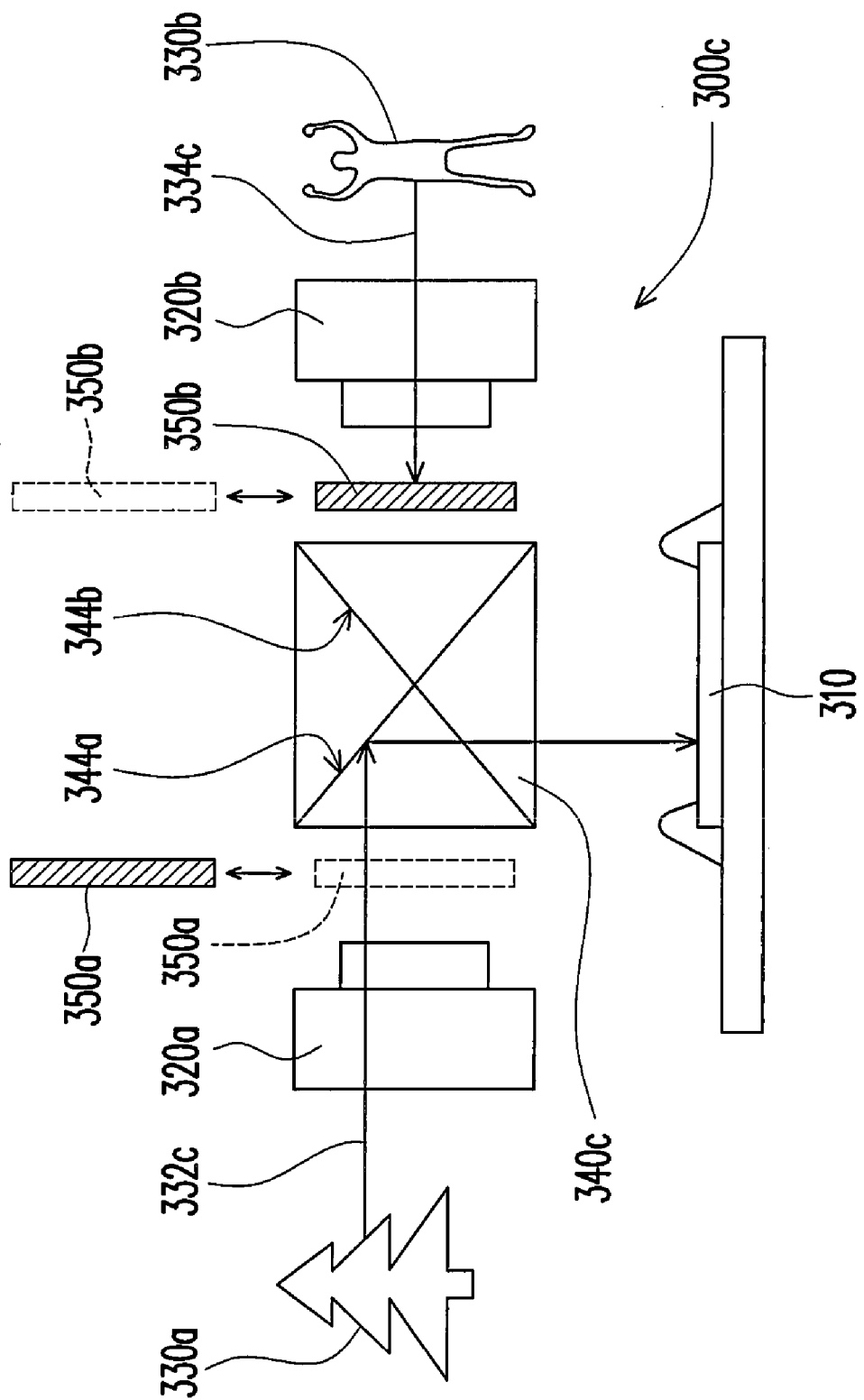
FIG. 5A and FIG. 5B are diagrams respectively illustrating a camera module and the imaging light path thereof according to a third embodiment of the present invention.
Figure 5B:
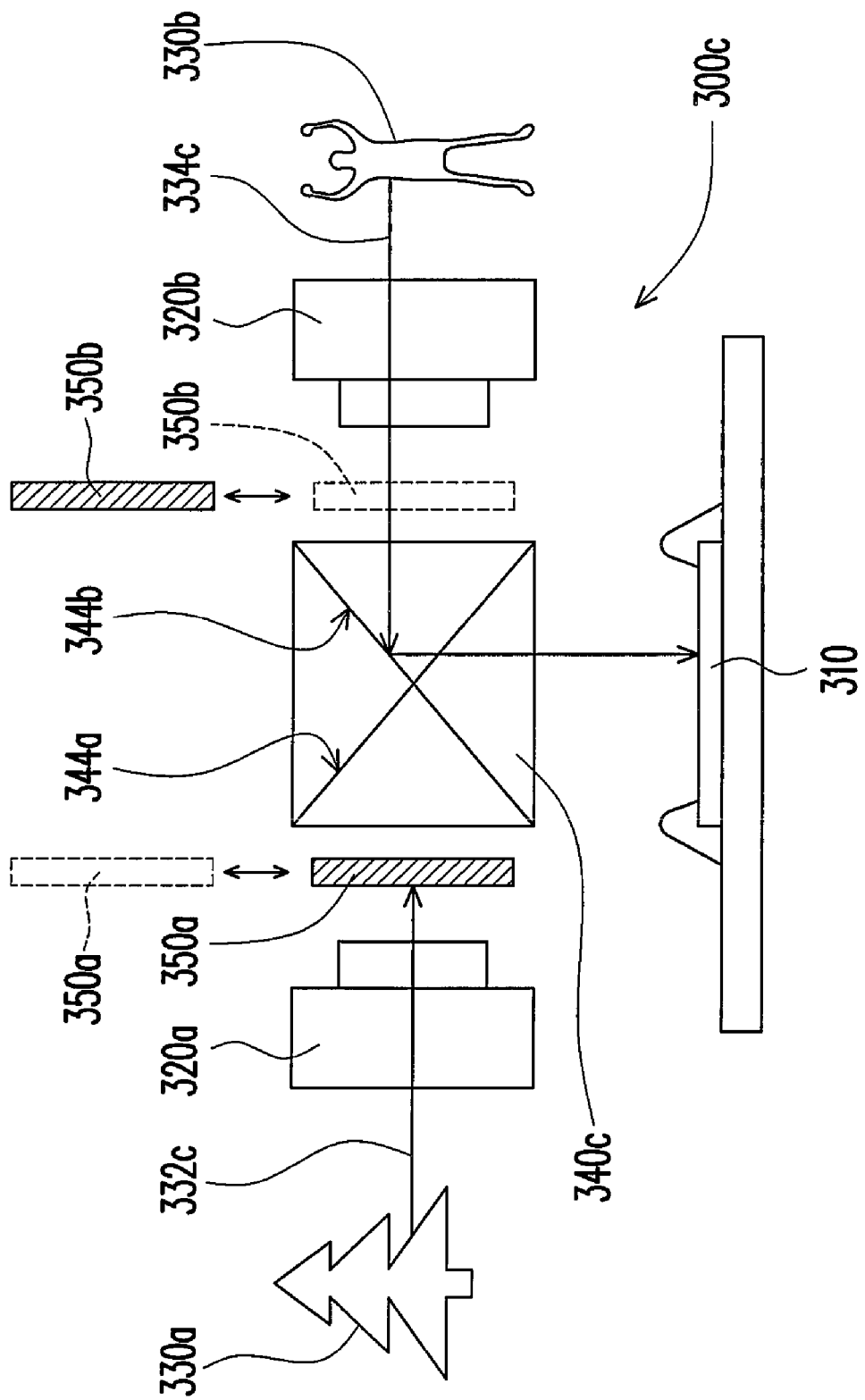

FIG. 5A and FIG. 5B are diagrams respectively illustrating a camera module and the imaging light path thereof according to the third embodiment of the present invention. Referring to FIGS. 5A and 5B, the camera module 300c of the embodiment is roughly the same as the camera module 300a of the first embodiment except that the beam splitting and combining component 340c of the camera module 300c is an X prism. The beam splitting and combining component 340c has a first reflection surface 344a and a second reflection surface 344b intersecting each other at the middle thereof, while the first lens 320a and the second lens 320b are respectively located at two side surfaces opposite to each other of the beam splitting and combining component 340c. The first lens 320a is suitable for imaging the first object 330a onto the image sensor 310, while the second lens 320b is suitable for imaging the second object 330b onto the image sensor; the first light beam 332c of the first object 330a is suitable to image onto the image sensor 310 along an optical path reflected by the first reflection surface 344a, while the second light beam 334c of the second object 330b is suitable to image onto the image sensor 310 along an optical path reflected by the second reflection surface 344b.

The advantage of the camera module 300c and its operation for capturing images in the present embodiment are the same as the camera module 300a of the first embodiment, thus, description thereof are repeated herein.

The Fourth Embodiment

Figure 6:
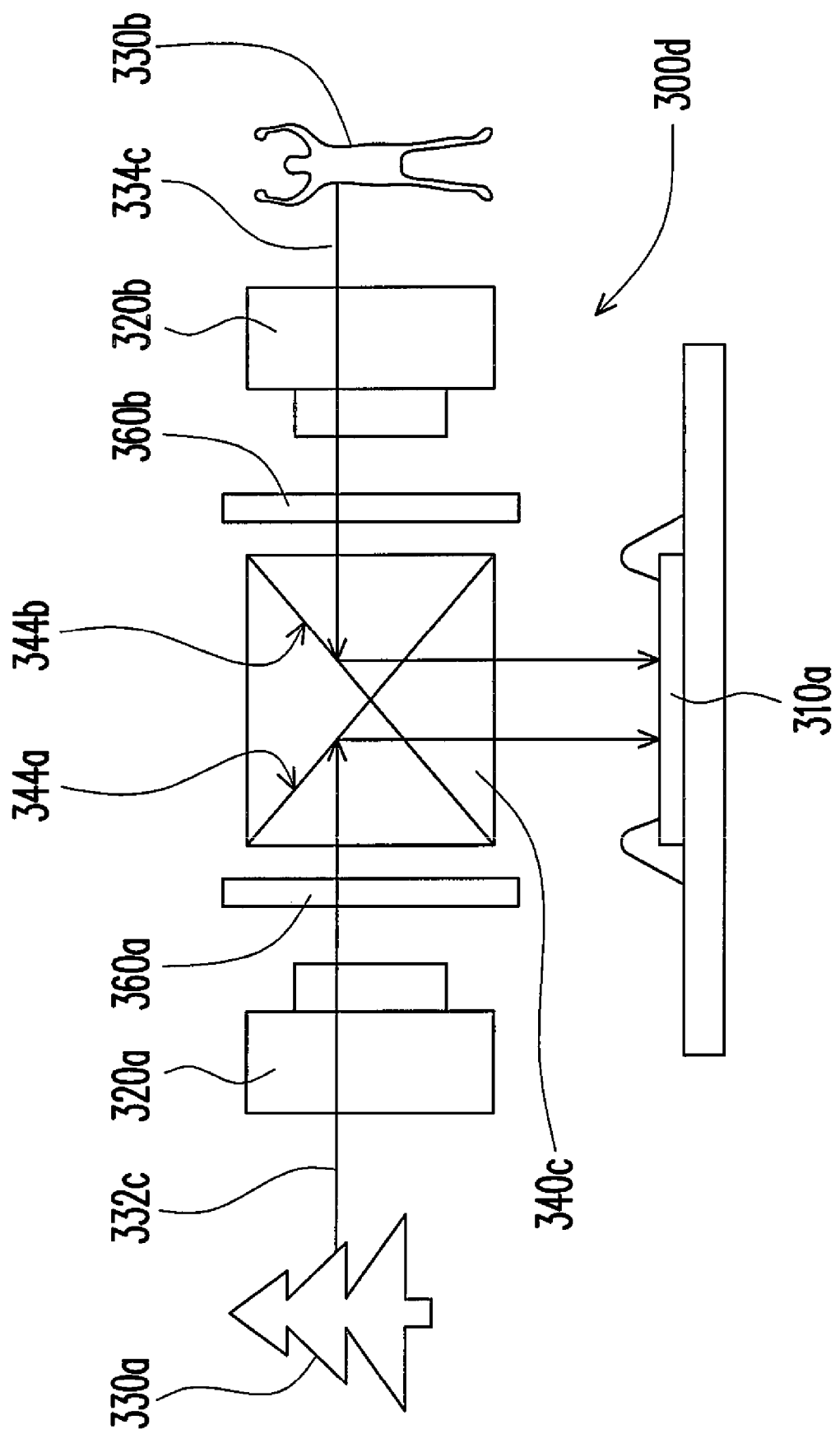
FIG. 6 is a diagram illustrating a camera module and the imaging light path thereof according to a fourth embodiment of the present invention.

FIG. 6 is a diagram illustrating a camera module and the imaging light path thereof according to the fourth embodiment of the present invention. Referring to FIG. 6, the camera module 300d of the embodiment is roughly the same as the camera module 300c of the third embodiment except that the camera module 300d further includes a first polarizing plate 360a disposed between the first object 330a and the beam splitting and combining component 340c and a second polarizing plate 360b disposed between the second object 330b and the beam splitting and combining component 340c, and the embodiment does not require the first light shield 350a and the second light shield 350b. The detail description regarding the first polarizing plate 360a, the second polarizing plate 360b and the image sensor 310a can be referred to the second embodiment. Different from the camera module 300c, the camera module 300d of the present embodiment does not need a moveable part (i.e. the first light shield 350a and the second light shield 350b are not needed), which makes the structure simple and could further reduce the production cost.

The Fifth Embodiment

Figure 7A:
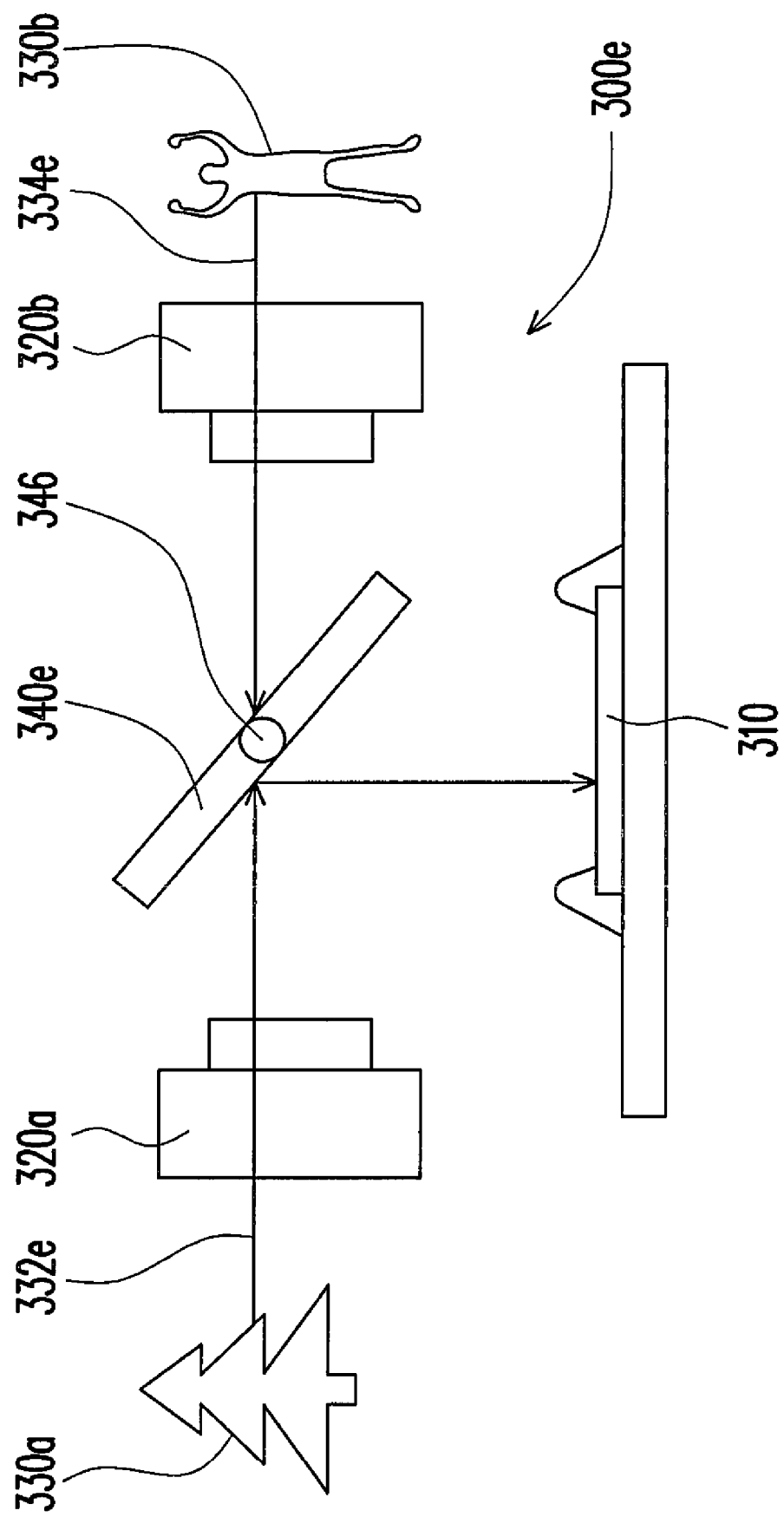
FIG. 7A~FIG. 7C are diagrams respectively illustrating a camera module and the imaging light path thereof according to a fifth embodiment of the present invention.
Figure 7B:
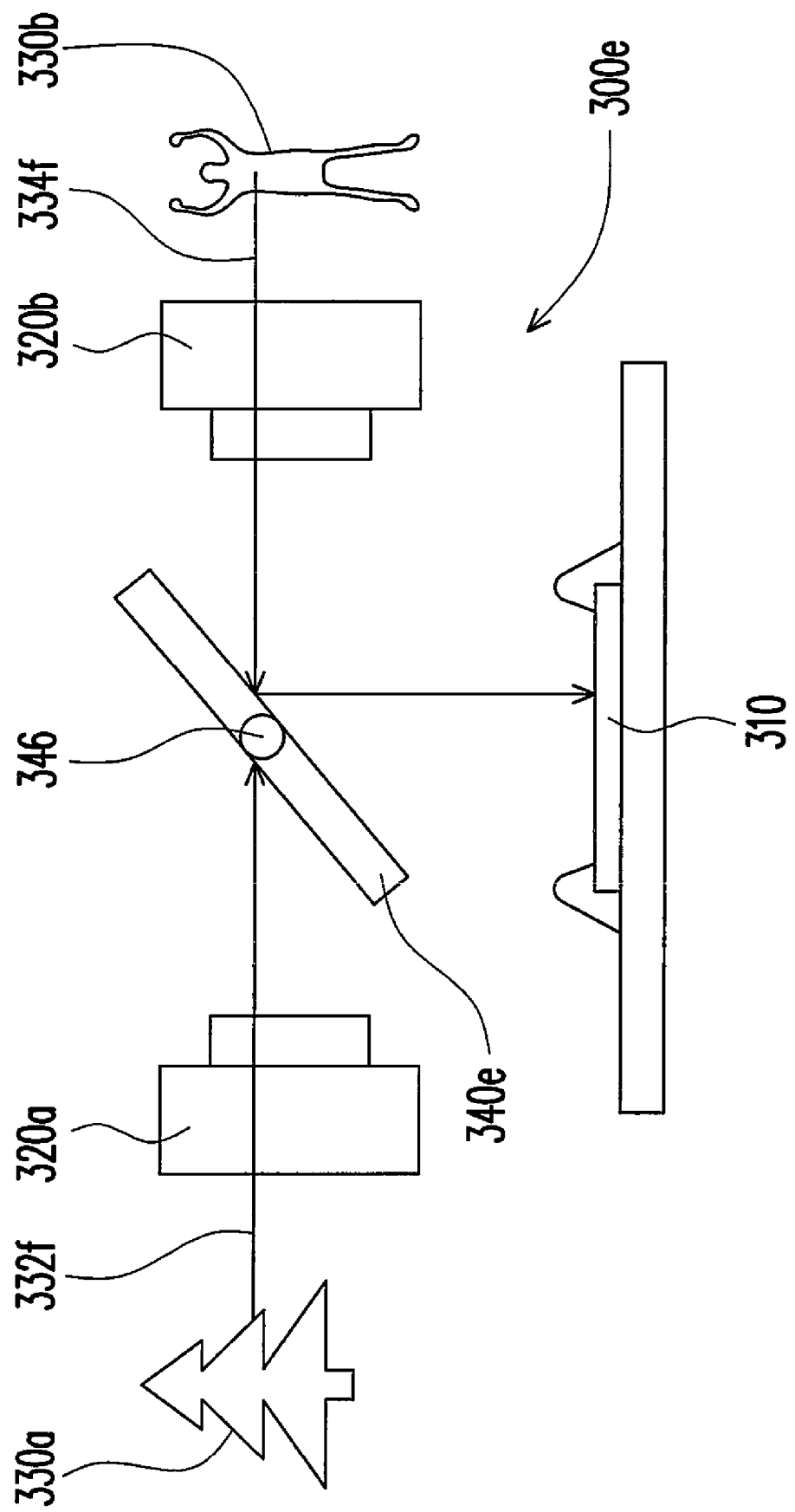
Figure 7C:
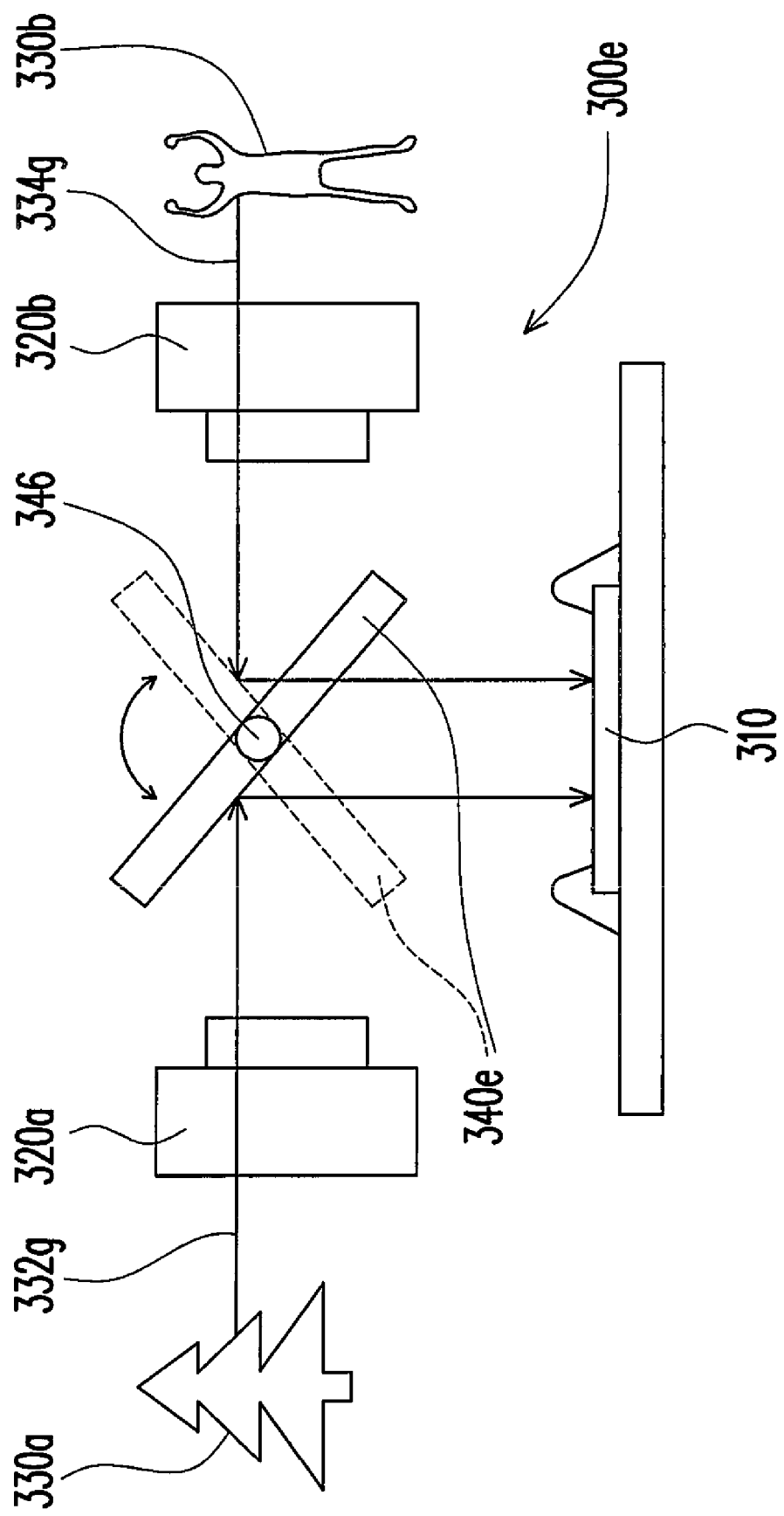

FIG. 7A~FIG. 7C are diagrams respectively illustrating a camera module and the imaging light path thereof according to the fifth embodiment of the present invention. Referring to FIGS. 7A and 7B, the camera module 300e of the embodiment is roughly the same as the camera module 300c of the third embodiment except that the beam splitting and combining component 340e of the camera module 300e is a reflection mirror and there is no need of the first light shield 350a and the second light shield 350b. The reflection mirror can swing between a first position and a second position about a pivot 346. When the taking the first position (as shown by FIG. 7A), the beam splitting and combining component 340e reflects a first light beam 332e of the first object 330a onto the image sensor 310 for capturing the image of the first object 330a, while a second light beam 334e of the second object 330b is not reflected onto the image sensor 310. When taking the second position (as shown by FIG. 7B), the beam splitting and combining component 340e reflects a second light beam 334f of the second object 330b onto the image sensor 310 for capturing the image of the second object 330b, while a first light beam 332f of the first object 330a is not reflected onto the image sensor.

Referring to FIG. 7C, under the movie photographing mode, the camera module 300e repeatedly oscillates the beam splitting and combining component 340e between the first position and the second position, with a oscillating frequency, for example, 60 Hz or higher, so as to capture the image of the first object 330a and the second object 330b simultaneously.

It should be noted that the above-mentioned pivot 346 can be located at the center of the beam splitting and combining component 340e or can also be located at one of the two ends of the beam splitting and combining component 340e or at any position between the ends and the center of the beam splitting and combining component 340e. Besides, in the camera modules 300c, 300d and 300e respectively corresponding to the third embodiment, fourth embodiment and fifth embodiment (where the first lens 320a and the second lens 320b are located at both side surfaces of the beam splitting and combining component 340c opposite to each other), the first lens 320*a* and the second lens 320*b* can be respectively a wide-angle lens, so as to achieve an approximate 360° panoramic effect.

In summary, the camera module of the present invention has at least one or more of the following advantages:

1. Since a first lens and a second lens aiming two different directions are used in a single camera module, the present invention is able to provide the two-way image-capturing function.
2. Compared to the prior art where two camera modules are needed, the camera module of the present invention needs only one image sensor, and therefore the size and the production cost of the camera module can be reduced.
3. The two lenses image two different objects onto a single image sensor, which assures the quality consistency of the images.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A camera module, comprising:
   an image sensor;
   a first lens, suitable for imaging a first light beam of a first object onto the image sensor, wherein the first object is located in a first direction from the camera module;
   a second lens, suitable for imaging a second light beam of a second object onto the image sensor, wherein the second object is located in a second direction from the camera module, and the first direction is different from the second direction;
   a beam splitting and combining component, disposed between the first lens, the second lens and the image sensor, wherein the first light beam and the second light beam are imaging onto the image sensor through the beam splitting and combining component;
   a first light shield, suitable for being shifted into or off between the beam splitting and combining component and the first object; and
   a second light shield, suitable for being shifted into or off between the beam splitting and combining component and the second object, wherein the second light shield is shifted into between the beam splitting and combining component and the second object for blocking the second light beam when the first light shield is shifted off between the beam splitting and combining component and the first object, and wherein the first light shield is shifted into between the beam splitting and combining component and the first object for blocking the first light beam when the second light shield is shifted off between the beam splitting and combining component and the second object;
   wherein a shift frequency of the first light shield and the second light shield is equal to or greater than 60 Hz for filming the first object and the second object simultaneously.

2. The camera module as recited in claim 1, wherein the beam splitting and combining component comprises a total internal reflection prism having a total reflection surface, wherein the first lens and the second lens thereof are located at two adjacent side surfaces of the total internal reflection prism, the first light beam is suitable for passing through the total reflection surface to image onto the image sensor and the second light beam is suitable for being reflected by the total reflection surface to image onto the image sensor.

3. The camera module as recited in claim 1, wherein the beam splitting and combining component comprises an X-prism, the X-prism has a first reflection surface and a second reflection surface intersecting each other, the first lens and the second lens are respectively located at two side surfaces opposite to each other, the first light beam is suitable for being reflected by the first reflection surface and imaging onto the image sensor, while the second light beam is suitable for being reflected by the second reflection surface and imaging onto the image sensor.

4. The camera module as recited in claim 1, wherein the image sensor comprises a charge coupled device (CCD) or a complementary metal oxide semiconductor image sensor (CMOS image sensor).

5. The camera module as recited in claim 1, wherein the first lens and the second lens are respectively a wide-angle lens.

6. The camera module as recited in claim 5, wherein the first direction is opposite to the second direction, and the first lens and the second lens are respectively oriented towards the first direction and the second direction.

7. A camera module, comprising:
   an image sensor;
   a first lens, suitable for imaging a first light beam of a first object onto the image sensor, wherein the first object is located in a first direction from the camera module;
   a second lens, suitable for imaging a second light beam of a second object onto the image sensor, wherein the second object is located in a second direction from the camera module, and the first direction is different from the second direction; and
   a reflection mirror swinging between a first position and a second position, wherein at the first position, the reflection mirror reflects the first light beam onto the image sensor, while at the second position, the reflection mirror reflects the second light beam onto the image sensor, a swinging frequency of the reflection mirror is equal to or greater than 60 Hz for filming the first object and the second object simultaneously.

8. The camera module as recited in claim 7, wherein the image sensor comprises a charge coupled device (CCD) or a complementary metal oxide semiconductor image sensor (CMOS image sensor).

9. The camera module as recited in claim 7, wherein the first lens and the second lens are respectively a wide-angle lens.

10. The camera module as recited in claim 9, wherein the first direction is opposite to the second direction, and the first lens and the second lens are respectively oriented towards the first direction and the second direction

\* \* \* \* \*